US008064090B2

(12) United States Patent
Kahana et al.

(10) Patent No.: US 8,064,090 B2
(45) Date of Patent: *Nov. 22, 2011

(54) SYSTEM AND METHOD FOR PROCESSING VARIABLE PRINT DOCUMENTS

(75) Inventors: Gal Bezalel Kahana, Netanya (IL); Yaniv Israeli, Tenafly, NJ (US); Reuven Sherwin, Ra'anana (IL); Amit Cohen, Herzlia (IL); Israel Roth, Ra'anana (IL)

(73) Assignee: XMPie (Israel) ltd., Netanya (IL)

( * ) Notice: Subject to any disclaimer, the term of this patent is extended or adjusted under 35 U.S.C. 154(b) by 157 days.

This patent is subject to a terminal disclaimer.

(21) Appl. No.: 11/979,640

(22) Filed: Nov. 6, 2007

(65) Prior Publication Data

US 2008/0144108 A1 Jun. 19, 2008

Related U.S. Application Data

(63) Continuation-in-part of application No. 10/525,962, filed as application No. PCT/IL03/00708 on Aug. 28, 2003, now Pat. No. 7,548,338.

(60) Provisional application No. 60/406,333, filed on Aug. 28, 2002, provisional application No. 60/856,835, filed on Nov. 6, 2006.

(51) Int. Cl.
*G06K 15/00* (2006.01)
*G06K 1/00* (2006.01)
*G06F 3/12* (2006.01)
*G06F 15/00* (2006.01)

(52) U.S. Cl. ...................................... 358/1.18; 358/1.1

(58) Field of Classification Search .......................... None
See application file for complete search history.

(56) References Cited

U.S. PATENT DOCUMENTS

| 5,655,130 | A  | 8/1997  | Dodge et al.     |
|-----------|----|---------|------------------|
| 5,937,153 | A  | 8/1999  | Gauthier         |
| 6,008,812 | A  | 12/1999 | Ueda et al.      |
| 6,052,486 | A  | 4/2000  | Knowlton et al.  |
| 6,088,708 | A  | 7/2000  | Burch et al.     |
| 6,209,010 | B1 | 3/2001  | Gauthier et al.  |
| 6,381,028 | B1 | 4/2002  | Gauthier         |
| 6,470,156 | B1 | 10/2002 | Sahay            |
| 6,476,931 | B1 | 11/2002 | Aizikowitz et al.|
| 6,487,568 | B1 | 11/2002 | Gauthier et al.  |
| 6,599,325 | B2 | 7/2003  | Gauthier et al.  |
| 6,687,016 | B2 | 2/2004  | Gauthier         |

(Continued)

OTHER PUBLICATIONS

International Search Report for International Application No. PCT/IL03/00708 mailed Nov. 24, 2004.

*Primary Examiner* — Benny Tieu
*Assistant Examiner* — Fan Zhang
(74) *Attorney, Agent, or Firm* — Pearl Cohen Zedek Latzer, LLP

(57) ABSTRACT

Processing of a variable print document corresponding to a plurality of elements, each element having a type, a coverage area and a z-axis value, may be improved by creating a composite elements to replace groups of elements when element types are compatible and when creating composite elements is desirable based at least on the coverage area of the composite element, for example, in relation to the sum of the coverage areas of the elements in the group, and otherwise swapping z-axis values of elements if the elements do not overlap. Elements may further include at least one of a transparency and/or text-wrap parameter, which may be used in the method for producing composite elements.

19 Claims, 12 Drawing Sheets

U.S. PATENT DOCUMENTS

| | | |
|---|---|---|
| 6,763,500 B2 | 7/2004 | Black et al. |
| 6,771,387 B2 | 8/2004 | Gauthier |
| 6,919,967 B1 | 7/2005 | Pentecost et al. |
| 7,110,137 B2 | 9/2006 | Burgess et al. |
| 7,519,899 B2 * | 4/2009 | Foehr et al. ............ 715/200 |
| 7,548,338 B2 * | 6/2009 | Cohen et al. ............ 358/1.18 |
| 2003/0050934 A1 | 3/2003 | Gauthier et al. |
| 2003/0095135 A1 | 5/2003 | Kaasila et al. |
| 2004/0130752 A1 | 7/2004 | Gauthier |
| 2004/0141197 A1 | 7/2004 | Gauthier |
| 2004/0145755 A1 * | 7/2004 | Ishiguro ............ 358/1.1 |
| 2005/0055635 A1 * | 3/2005 | Bargeron et al. ............ 715/525 |
| 2006/0044614 A1 * | 3/2006 | Cohen et al. ............ 358/1.18 |

\* cited by examiner

|   | 1 | 2 | 3 | 4 | 5 | 6 |
|---|---|---|---|---|---|---|
| 1 | ✕ | 0 | 1 | 1 | 1 | 0 |
| 2 | 0 | ✕ | 0 | 1 | 0 | 1 |
| 3 | 1 | 0 | ✕ | 0 | 0 | 0 |
| 4 | 1 | 1 | 0 | ✕ | 0 | 1 |
| 5 | 1 | 0 | 0 | 0 | ✕ | 0 |
| 6 | 0 | 1 | 0 | 1 | 0 | ✕ |

Fig. 2

|      | 2 | 1U3 | 4 | 5 | 6 |
|------|---|-----|---|---|---|
| 2    | X | 0   | 1 | 0 | 1 |
| 1U3  | 0 | X   | 1 | 1 | 0 |
| 4    | 1 | 1   | X | 0 | 1 |
| 5    | 0 | 1   | 0 | X | 0 |
| 6    | 1 | 0   | 1 | 0 | X |

|  | 2 | 1U3U5 | 4 | 6 |
|---|---|---|---|---|
| 2 | × | 0 | 1 | 1 |
| 1U3U5 | 0 | × | 1 | 0 |
| 4 | 1 | 1 | × | 1 |
| 6 | 1 | 0 | 1 | × |

Fig. 6

|  | 2 | 1U3U5 | 4U6 |
|---|---|---|---|
| 2 | × | 0 | 1 |
| 1U3U5 | 0 | × | 1 |
| 4U6 | 1 | 1 | × |

Fig. 7

SYSTEM AND METHOD FOR PROCESSING VARIABLE PRINT DOCUMENTS

CROSS-REFERENCE TO RELATED APPLICATIONS

This application is a continuation in part of U.S. patent application Ser. No. 10/525,962, filed Feb. 28, 2005, now U.S. Pat. No. 7,548,338, which is a National Phase Application of PCT Application No. PCT/IL03/00708, having International Filing Date Aug. 28, 2003, which in turn claims priority from U.S. Provisional Patent Application No. 60/406,333, filed Aug. 28, 2002, the contents of which are all incorporated herein by reference. This application also claims benefit of U.S. Provisional Patent Application No. 60/856,835, filed Nov. 6, 2006, the contents of which are incorporated herein by reference.

BACKGROUND OF THE INVENTION

In variable print technologies, document sets are produced in which each document in the set is targeted or personalized to a different recipient, but all documents of the set may share some elements. Elements in the document may be categorized into three types, namely, fixed, reusable and unique. Fixed elements are used by each and every document in the set. Reusable elements are used by at least two but not all documents in the set. Unique elements are used only by one document in the set. The sharing of fixed or reusable elements may improve the efficiency of processing variable print documents because shared elements may be described, processed, and cached collectively in one action, thereby to reduce memory- and time-consuming redundancy.

Creation of variable print documents using state of the art authoring systems may rely on the use of a page layout tool and a method of specifying the logic of each document in the set. The logic may dictate the selection of reusable elements based on certain data in a database and certain business rules. The logic may also specify how to generate the unique elements, for example, a text element may contain a unique address of a recipient.

The output of such authoring tools is a print stream in a standard format describing the pages to be printed. The commonly used formats for printing such jobs efficiently describes the documents in the set in terms of the elements that make up the document. This improves the efficiency of the description in terms of file size as well as providing the necessary information for the printing system to perform further optimizations and caching. Examples of commonly used print stream formats that employ the methodology of describing documents in terms of reusable elements include Creo's proprietary Variable Print Specifications (VPS) format, Personalized Print Markup Language (PPML), for example, as defined by the Print On Demand Initiative, and Personalized Print Markup Language/Variable Data Exchange (PPML/VDX), developed by the Committee for Graphic Arts Technologies Standards (CGATS), and it was approved by the American National Standards Institute (ANSI) in 2002 and available from the Association for Suppliers of Printing, Publishing and Converting Technologies (NEPS).

The operation of authoring tools may be defined by the page layout space and the print stream space.

The page layout space describes the intended appearance of a page in terms of page elements, which may be created by a graphic designer using page layout tools such as, for example, Quark Xpress or Adobe InDesign. These page layout tools allow the designer to place, e.g., on a computer screen, a representation of the final page, rectangular frames, text boxes, raster images, and other shapes. The page layout application may be augmented by a dynamic document authoring tool that allows insertion of data or logic driven elements into the design space. For example, a name or address may be inserted to a text paragraph, or an image of a product may be dynamically inserted to an image box. The authoring tool may maintain the information on the nature of reuse of each element (for example, whether it is fixed, reusable or unique). The print stream space may describe the print job in terms of a set of elements (e.g., fixed, reusable or unique) and a set of page descriptions that make references to these elements.

In order for an authoring tool to produce its output, it is desirable to map the elements from the page layout space to elements in the print stream space and generate the page descriptions in terms of references. A basic mapping scheme may dictate that:

(a) For each fixed element in the print layout space, generate one corresponding fixed element in the print stream space.

(b) For each reusable element in the print layout space, there may be k different reusable elements in the print stream space, k being the number of different instances.

(c) For each unique element in the print layout space, there will be n different unique elements in the print stream space, n being the number of recipients, or number of instance documents in the set.

The authoring tool may use the basic mapping scheme to map most elements from the page layout space description of the document to the print stream. However, with an increased number of elements, the amount of processing may increase significantly. Moreover, with an increased number of overlapping elements, there is an increased amount of redundant or unnecessary processing because processing speed may be proportional to the total coverage area of all the elements in the document. Thus, using current techniques, a variable print document may often exceed the cache for the raster image processor (RIP) associated with the output device, e.g., the printer. A method and apparatus are therefore desirable for efficient processing of data in the production of variable print documents.

SUMMARY OF EMBODIMENTS OF THE INVENTION

A method in accordance with embodiments of the present invention allows for processing of a variable print document corresponding to a plurality of elements, each element having a type, a coverage area and a z-axis value, by creating a composite elements to replace groups of elements when element types are compatible and when creating composite elements is desirable based at least on the coverage area of the composite element, for example, in relation to the sum of the coverage areas of the elements in the group, and otherwise swapping z-axis values of elements if the elements do not overlap. A method in accordance with embodiments of the present invention may allow for reducing the total coverage area of a document, as well as reducing the total number of elements in the documents, without visibly altering the original visual layout of the document. Because creating composite elements to replace a plurality of elements may result in an increase in total coverage area, the method may ensure that a maximum total coverage area is not exceeded, for example, by setting a threshold maximum total coverage area.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a schematic diagram of an intersection matrix corresponding to the layout of FIGS. 1A and 1B, in accordance with embodiments of the present invention;

FIG. 6 is a schematic diagram of an intersection matrix, in accordance with embodiments of the present invention;

FIG. 7 is a schematic diagram of an intersection matrix, in accordance with embodiments of the present invention;

Figures 1A, 1B:
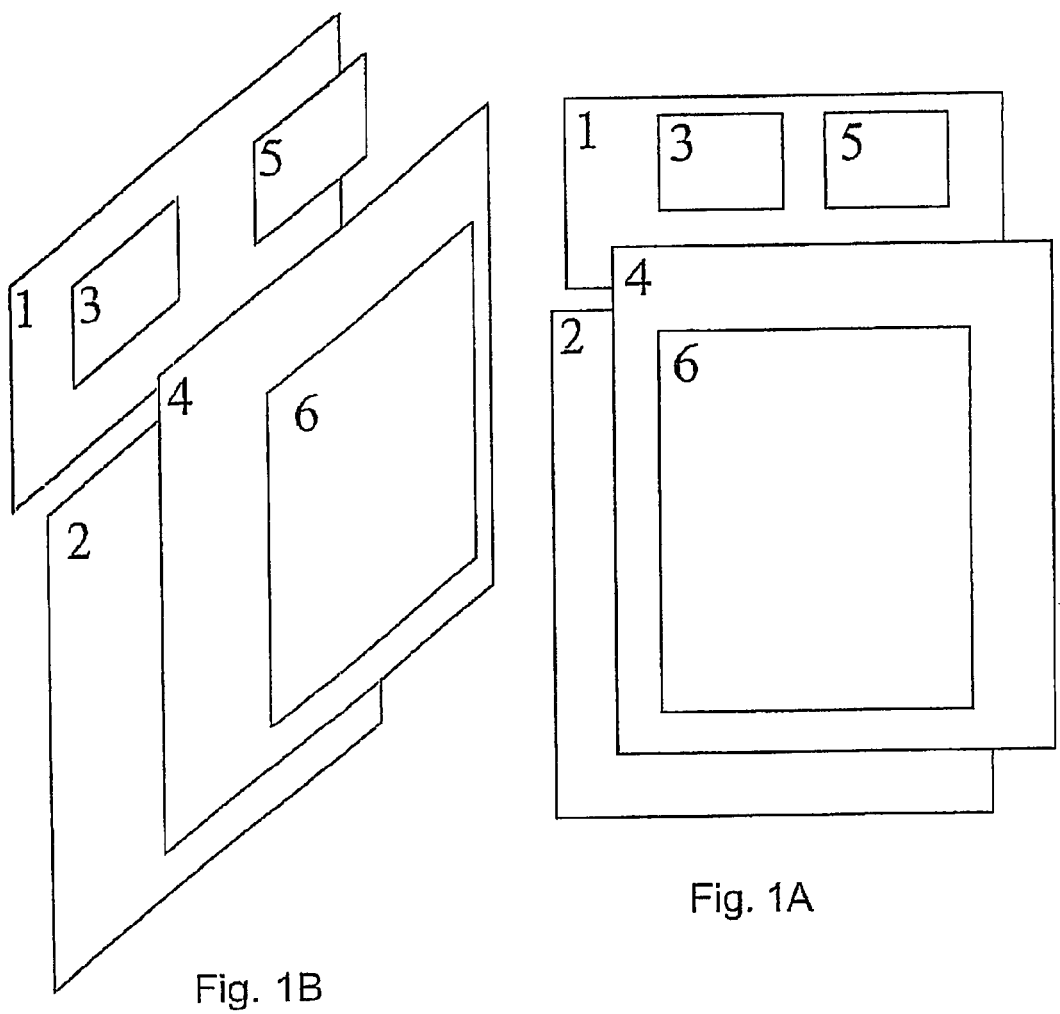
FIGS. 1A and 1B are conceptual top and oblique views of an illustration of a layout of a variable print document having fixed, reusable and unique elements in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method in accordance with an exemplary embodiment of the present invention may assume a description of a document in terms of its pages where each page may be formed of a set of page elements. Page elements may be, for example, text boxes, image boxes or objects of any other format or geometric shape. For purposes of illustration, reference is made to FIGS. 1A and 1B, which are conceptual illustrations of top and oblique views of a page layout space. The page layout space describes the intended appearance of a page in terms of page elements, which may be created by a graphic designer using a desktop tool such as Quark Xpress or Adobe InDesign. The page layout tools allow the designer to place, e.g., on a computer screen representation of the final page, rectangular frames, text boxes, raster images, and other shapes. The page layout application may be augmented by a dynamic document authoring tool that allows insertion of data or logic driven elements into the design space. The authoring tool may maintain information on the nature of reuse of each element, for example, whether it is fixed, reusable or unique. The example page layout shown in FIGS. 1A and 1B contains design elements 1, 2, 3, 4, 5 and 6. These elements are described further below. In exemplary embodiments of the invention, for each such page element, at least the following information may be provided, recorded or obtained. It will be noted that in other embodiments of the invention, other structures for describing the page layout and its component elements may be used:

(a) Element Geometry. The geometry of an element may include, for example, the shape and location of the element. Among the characteristics of the geometry of an element may, for example, be its bounding box, a rectangular, polygonal or other area enclosing the element. Such bounding boxes are indicated in FIGS. 1A and 1B by rectangles 1 through 6. It will be understood that the elements represented in the conceptual illustration of FIGS. 1A and 1B need not be rectangular or even polygonal. In some embodiments of the invention, a rectangular or other polygonal enclosing space may be used as an approximation for the coverage area of the element; however, it will be recognized that no approximation or model need be used in connection with certain embodiments of the present invention, and in embodiments using such approximations or models, any suitable shape may be used. For purposes of the example of FIGS. 1A and 1B, the following coverage areas of the respective bounding boxes are assumed: Element 1 has area 21 units; Element 2 has area 56 units; Element 3 has area 3 units; Element 4 has area 56 units; Element 5 has area 3 units; Element 6 has area 30 units. Thus, without any optimization, the initial total coverage area of the elements on the page is 169 units, and the total number of elements is six (6). It will be noted that in some embodiments of the invention, bounding boxes are not used, but that information about the element, such as coverage area or location in the layout, may be obtained directly from the geometry of the element, and not through a bounding box approximation.

(b) z-order of element. In a description of page layout elements according to exemplary embodiments of the invention, z-order may denote the layering order of elements on the page. Each element may have an ordinal integer z-order value. Typically, for example, no two elements may have identical z-order number, and a portion of an element with a higher z-order may obscure a portion of an element with a lower z-order where the elements or their respective bounding boxes overlap. In the example illustrated in FIGS. 1A and 1B, the number used for each element indicates its location in the z-axis. Thus, element 1 is the bottom-most element, and all elements placed in higher z-axis order that overlap with element 1, for example, element 4, obscure those portions of element 1. Likewise, for example, element 6 obscures elements 2 and 4. It will be noted that if two elements or their respective bounding boxes do not intersect, such as, for example, elements 3 and 5, their respective z-order has no significance in the final appearance of the page with respect to each other, and as explained further below, in some circumstances, it may be advantageous to swap the z-axis order of the elements. It will be recognized that other methods may be used to describe the layering of elements in the page layout consistent with embodiments of the present invention.

(c) Element classification or type. In an exemplary embodiment described herein, type may be, for example, one of Unique, Reusable or Fixed. For purposes of the example provided in FIGS. 1A and 1B, it will be assumed that elements 1, 3, and 5 are fixed, each respectively have one instance, or one content. In contrast, unique elements 2, 4, and 6 may have as many different instances as there are documents in the set. It will be recognized that other suitable types may be defined and used in connection with other embodiments of the invention.

As discussed above, processing efficiency may partially be a function of total coverage area. Thus, if the total coverage area were to be reduced, processing time may be improved. This first goal may be accomplished, for example, by uniting elements that overlap at least partially. In exemplary embodiments of the invention, uniting elements may mean creating a single element having a shape identical to the composite shapes of the two elements. If the elements had at least partial overlap, the area of the new composite element including the two original elements may be less than the sum of the two coverage areas of the original elements. Thus, in some instances, coverage area may be reduced by uniting at least partially overlapping elements.

In addition, processing efficiency may also partially be a function of, for example, the total number of elements in the document, for example, due to overhead processing time costs for each element. Thus, reducing the total number of elements in a document may also improve processing. This second goal, like the first goal, may also be accomplished by uniting elements. It will be noted, however, that with regard to some elements, reducing the total number of elements may have the effect of increasing total coverage area, particularly, where there is no overlap between the elements. Thus, there may be a conflict between the goals of reducing total coverage area of the elements and reducing the total number of elements.

It will be noted that according to embodiments of the present invention, in uniting elements, the design intent is typically not altered. That is, the intent of the designer of the document with regard to which elements overlap which other elements is generally preserved.

It will be further noted that in some cases, even where uniting elements may serve one of the first and second goals stated above, and where uniting the elements would not interfere with the design intent, for example, where there is no overlap between the elements, the types of elements may not permit them to be united. According to some embodiments of the present invention, elements may only be united that share a type. Thus, where appropriate, a fixed element may be united with a fixed element. That is, a new composite fixed element may be created to replicate the effect of the two original fixed elements. Similarly, a unique element may be united with a unique element. These types may be compatible for uniting because two unique elements, for example, a first name and a last name, will always appear in conjunction with each other. In contrast, reusable elements typically may not be united because each may refer to different criteria, and have a different number of instances in the document set. It will be appreciated that the above description of exemplary embodiments is not intended to limit the scope of the present invention, and that in some embodiments of the invention, types may be defined differently, and the conditions for uniting elements may be different from those herein described.

According to an exemplary embodiment of the invention, at a pre-processing stage, certain procedures may be performed to facilitate the ensuing stages. In one pre-processing step, if such data is not already present, a z-axis value may be associated with each element of an input document, and the elements may be ordered accordingly.

In another pre-processing step, a matrix containing the intersection information with respect to the initial elements contained in the document may be calculated. An intersection matrix may be built as part of the initial phase of the algorithm as described herein to allow for simple testing of intersection of two elements to determine whether they may be combined. To build the matrix, all elements may be considered for intersection with all other elements. Exemplary embodiments of the invention may use a bounding box as an approximation for the coverage area of an element as described above, or the actual shapes of the elements, such as in the form of bitmap masks. A matrix may be created according to an exemplary embodiment of the invention to record the intersection or non-intersection of each element with the other elements. Thus, for example, if the bounding box of element i is compared against the bounding box of element j and found to overlap, the appropriate matrix entry (i,j) may be marked as "1"; otherwise it may be marked as "0". Other processing sets may be used in conjunction with embodiments of the present invention and the processing set herein described need not be used.

FIG. 2 is an illustration of an initial intersection matrix that may be used in connection with the variable document configuration of FIGS. 1A and 1B. Because element 1 intersects with elements 3, 4 and 5, a "1" is inserted into the appropriate locations in the matrix. During the course of the later phases of the algorithm, this matrix may be referred to in order to determine whether certain elements may or may not be swapped in the z-axis order. Two elements whose intersection value in the overlap matrix is "0" may be swapped. Two elements whose intersection value in the overlap matrix is "1" may not be swapped, because doing so would alter the visual appearance of the document. Each time two elements are joined, their corresponding intersection matrix entries may be joined by joining the appropriate two rows and two columns of the matrix. The intersection matrix values for the new compound element may be set to be "1" if either of the two original elements intersects an element. The intersection matrix values for the new compound element may be set to be "0" if neither of the two original elements intersects an element. It will be recognized that other pre-processing methods for determining intersection of elements may be used in conjunction with embodiments of the present invention, or the determination may not be made during pre-processing, but rather during processing of elements in accordance with a method in accordance with embodiments of the invention.

Figure 3:
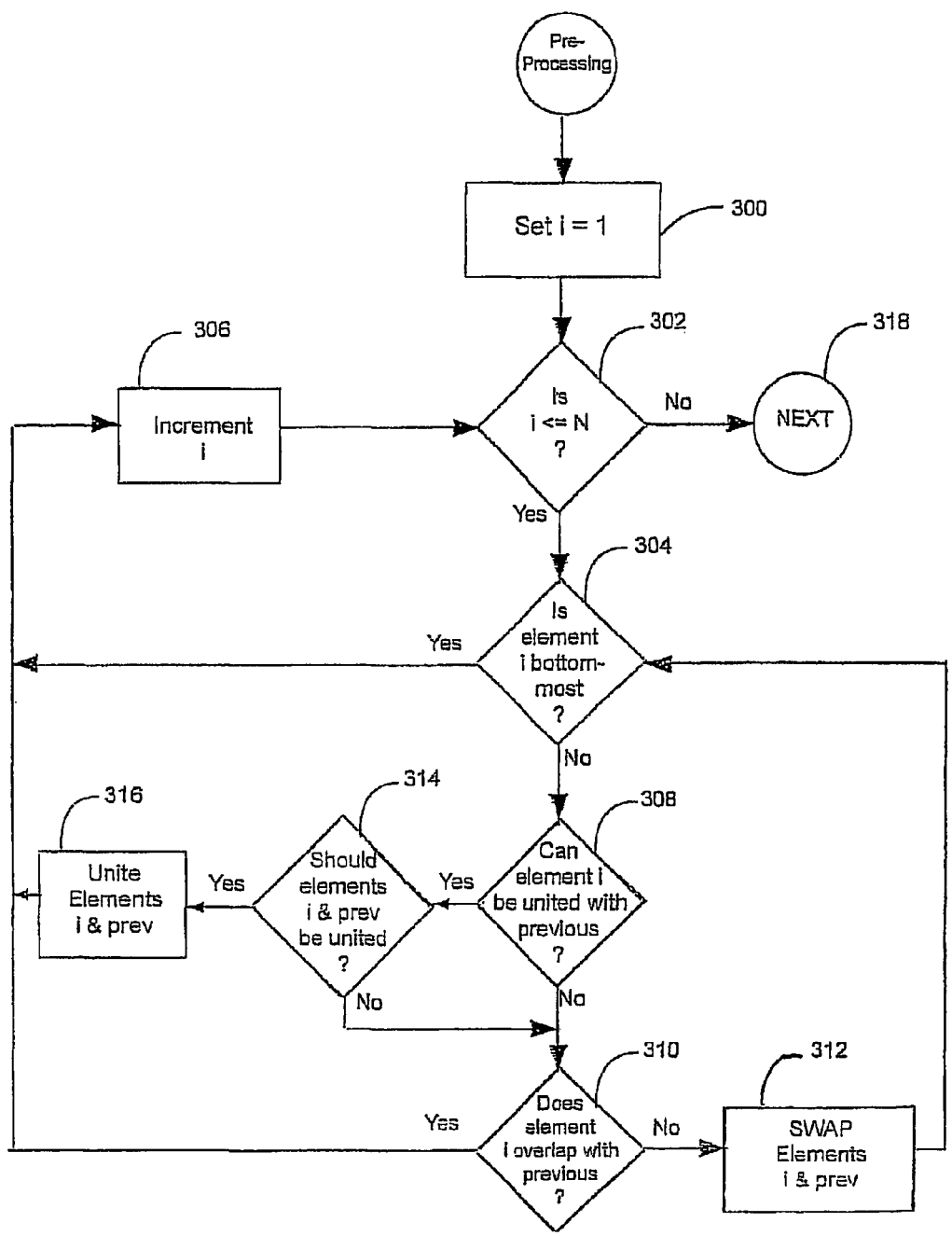
FIG. 3 is a schematic diagram of a flowchart for a method in accordance with embodiments of the present invention.

Using the layout of FIGS. 1A and 1B as an example, the intersection matrix illustrated in FIG. 3 may be constructed. Thus, for example, because element 1 overlaps with elements 3, 4 and 5, a "1" is inserted into the matrix at the crossing of element 1 and each of elements 3, 4, and 5. Likewise, because element 1 does not overlap with elements 2 and 6, a "0" is inserted into the matrix at the crossing of element 1 and each of elements 2 and 6.

It will be evident to those of sill in the art that the above pre-processing steps may or may not be included in embodiments of the invention. If they are so included, there are many variations of algorithms and structures that may accomplish similar goals within the scope of the present invention. In addition, it will be noted that in some embodiments, further accuracy of the overlap matrix may be obtained by using a polygonal or other non-rectangular enclosing path that better describe the elements for irregular shapes, or for example, performing a bit-map comparison of the actual shapes to determine whether they overlap.

A method in accordance with the present invention may operate to reduce the total coverage area of elements in the document, as well as the total number of elements in the document by uniting elements. According to an exemplary embodiment of the invention, pairs of elements are processed to determine whether uniting them, that is, creating a composite element to replace the two elements, is desirable. If not, the method may determine whether they may be changed in the z-axis order in order to permit possible uniting with another element. FIG. 3 is a schematic illustration of a flowchart of a method in accordance with an exemplary embodiment of the present invention. The following discussion represents a discussion of the exemplary embodiment presented as well as a simplified depiction of how an embodiment of the invention may be applied to the document depicted in FIGS. 1A and 1B. As noted above, the intersection matrix may be created as illustrated in FIG. 2.

At block 300, the parameter i is set to the number 1, representing that the elements are to be considered starting with the element lowest in the z-axis order. At block 302, the method determines whether elements remain to be analyzed. If so, the method may loop through the flowchart another time for element i, starting with block 304; if not, and all elements have been analyzed, the method may proceed to another stage, at block 318. This ensures that the loop ends when i exceeds the maximum value of N, the number of elements in the z-axis. Thus, ELMS, referring to Element i, which in the first iteration according to this example, is Element 1, is first considered.

At block 304, the method determines whether Element i cannot be "pushed down" in the z-axis order, that is, whether it is not at the bottom of the layout. If the element is at the bottom, i may be incremented at block 306, and the next element may be processed. If the element is not at the bottom of the layout, the method may proceed to block 308. In the example given, because Element 1 is the lowest in the z-axis order, i is incremented at block 306.

The process then repeats for i=2. Next, Element 2 is considered. At block 304, it is determined that Element 2 is not at the bottom of the z-axis order. Next, at block 308, the method may determine whether Element i may be united with the element previous to it, or directly lower than it, in the z-axis. In order to determine whether two element types are compatible for being united, in this exemplary embodiment they must both be fixed or both be unique. According to one embodiment of the invention, a unification matrix may be created to contain the unification compatibility of each pair of elements. According to an embodiment of the present invention, in order to determine whether it is possible to unify two elements, the intersection matrix may be consulted to determine whether the two elements are non-overlapping. For example, two unique elements may be unified with each other, and two fixed elements may be unified with each other. It will be appreciated that other embodiments of the invention may use a different analysis to determine whether elements may be united. If the elements may be united, the method proceeds to block 314 to determine whether uniting the elements is desirable; if they may not be united, at block 310 the method determines whether the elements overlap. In the example provided, because Element 1 is fixed and Element 2 is unique, the elements are of incompatible type, and they cannot be united.

Next, at block 310, it is determined whether element i and the previous element in the z-axis order overlap. If so, as shown at block 306, the method proceeds to analyze the next element; if not, as shown at block 312, the z-axis of the elements are swapped. In the example provided, Element 2 and Element 1 overlap. According to the intersection matrix of FIG. 2, a "0" appears at the crossing of Elements 1 and 2, indicating that there is no overlap between them. Thus, the method may proceed to block 312, where the z-axis order of Elements 1 and 2 may be swapped. According to an exemplary embodiment of the invention, swapping two elements indicates involves interchanging their order in the z-axis. In the example given, Element 2 is re-assigned a z-axis order of 1, and Element 1 is re-assigned a z-axis order of 2. Upon swapping elements, according to an exemplary embodiment of the invention, the rows and columns of the intersection matrix representing the elements being swapped may also be swapped. Thus, after swapping Elements 1 and 2, the column containing the intersection information for Element 1 is swapped with the column containing the intersection information for Element 2. Likewise, the rows for the two elements may be swapped. Thus, the order of elements along the z-axis is now 2-1-3-4-5-6. The above is a description of how swapping elements may be accomplished in accordance with the embodiment presented herein. It will be recognized that swapping elements may be accomplished in numerous ways, depending, for example, on the structure used to describe elements in the layout. Subsequently, at block 304, the method again determines whether the element analyzed is at the bottom of the z-axis. In the example provided, Element 2, which has z-axis order 1, is determined to be the bottom-most element in the z-axis order. Thus, i is incremented to 3 at block 306.

The analysis loop starting with block 304 may be repeated for each element. In the example provided, at block 304, Element 3 is not bottom-most. At block 308, the method determines whether Element 3 may be united with the element directly below it, which is Element 1. In the example provided according to an exemplary embodiment of the invention, the two elements may be united because they both have fixed type. Next, at block 314, the method may determine whether uniting the elements is desirable. While there are numerous ways to determine whether uniting the elements is desirable, in the embodiment of the invention herein described, this is done by determining whether uniting the elements would result in reduction of the total coverage area. The determination of whether uniting elements would result in a reduction of total coverage area of the document may be accomplished in various ways. According to an exemplary embodiment of the invention, this determination may be made by comparing the coverage area of a composite element representing the united elements to the sum of the individual coverage areas of the two elements. If the coverage area of the composite element is less than the sum of the coverage areas of the elements individually, then a reduction in total coverage area will result by uniting the elements.

In other exemplary embodiments of the invention, the determination of whether uniting the elements is desirable may be made by reference to the amount of coverage area reduction, giving preference to higher reductions in coverage area, and only when the unifications producing the greatest coverage area reduction are performed, permitting the unifications producing less reduction in coverage area. This prioritization based on amount of coverage area reduction may be performed in exemplary embodiments of the invention using a coverage area reduction factor k, where k represents the coverage area of a composite element combining two elements divided by the sum of the individual coverage areas of the elements. For pairs of elements for which k<1, unifying the elements may decrease area coverage in comparison to leaving the elements separate. Thus, in an exemplary embodiment of the invention, by first uniting pairs of elements having low k, and then the higher values of k elements having greater overlap may be united first, thereby uniting elements to produce a greater reduction of total coverage area first. In exemplary embodiments of the invention, the analysis of whether certain pairs of elements should be united may be based in part on a threshold value of k, which may be incrementally increased from 0.5 to 1, for example, in increments of $\Delta k_1$. Upon determining that all pairs of elements that can be united having k less than 1 have been united, it can be established that no further uniting of elements will result in a further reduction of total coverage area.

For pairs of elements for which k>1, uniting the elements may result in an actual increase of coverage area. As noted above, this may be desirable in order to reduce the number of elements in the document, particularly after all possible pairs of elements have been united that would result in a reduction of coverage area. If this is the case, an exemplary embodiment of the present invention may ensure that a maximum coverage area threshold is not exceeded by uniting the elements by calculating the coverage area of the composite element in addition to the coverage area of the existing elements, and ensuring that the maximum is not exceeded. Tie maximum coverage area may, for example, be calculated, or predetermined manually by the user or automatically by default or other parameters.

It will be recognized that there may be further methods for determining whether efficiency would be increased by uniting elements or whether it would otherwise be desirable to unite elements. In one embodiment of the invention, the intersection matrix may be consulted to determine whether the two elements overlap as an approximation of whether total coverage area would be reduced by uniting the elements. In an exemplary embodiment of the invention, an actual bitmap of a composite element made up of the two elements may be created and its coverage area compared to the sum of the coverage areas of the bitmaps of the original elements.

Figures 4, 5:
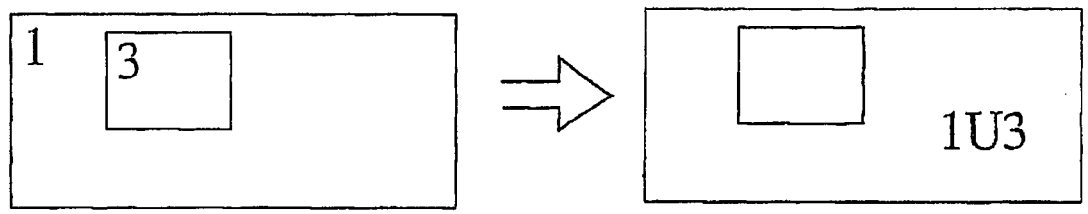
FIG. 4 is a conceptual diagram illustrating two elements of the layout of FIGS. 1A and 1B being united to form a composite element in accordance with embodiments of the present invention.
FIG. 5 is a schematic diagram of an intersection matrix, in accordance with embodiments of the present invention.

If it is determined that uniting the elements at hand would be desirable, for example, if total coverage area would be reduced, then as shown at block 316, the two elements are united. That is, as shown in FIG. 4, a new Element 1U3 may be created whose visual appearance may be identical to elements 1 and 3 superimposed, and whose type is the same as the two original elements, which in this example, is fixed. According to exemplary embodiments of the invention, when two elements are united, the intersection matrix may be updated accordingly. For example, according to an exemplary embodiment of the invention, a column and row may be created to replace the two adjacent rows and columns, wherein the intersection information for the new composite element is contained in the new row and column. FIG. 5 is an illustration of an updated intersection matrix When elements 1 and 3 are united, the z-axis order of the elements in the document is 2-IU3-4-5-6, where 1U3 represents the element created to correspond to the combined attributes of Elements 1 and 3. As depicted at block 306, i is then incremented, in this case to 4.

At block 304, Element 4 is determined not to be bottom-most in the z-axis order, because below it in the z-axis order are 2 and 1U3. Next, at block 308, it is asked whether Element 4 may be united with the element directly below it, which in this case, is Element 1U3. The elements cannot be united because Element 4 is unique and Element 1U3 is fixed. At block 310, it is determined whether Element 4 and the element below it, Element 1U3, overlap. In this case, the intersection matrix depicted in FIG. 5 shows that Elements 4 and 1U3 intersect, and therefore, the elements may not be swapped. As shown at block 306, i is then incremented to 5.

In the same matter as shown above, it is determined that Element 5 cannot be united with Element 4, but because there is no overlap, the two elements may be swapped, as shown at block 312. Thus, in the example shown for the exemplary embodiment, the rows and columns of Elements 5 and 4 may be swapped. Because Element 5 is still not bottom-most, as depicted at block 304, it is determined at block 308 whether Element 5 may be united with Element 1U3. Because the elements are of the same type, it is determined at block 308 that they may be united. At block 314, it is determined whether the total coverage of the document would be reduced by uniting the elements. In this case, because the proposed element IU3U5 would have less total coverage area than the sum of the total coverage areas of Elements 1U3 and 5, the creation of the new element IU3U5 would reduce total coverage area, and the Elements are combined, as shown at block 316. After swapping Elements 4 and 5, and creating new composite Element 1U3U5, the intersection matrix may be as depicted in FIG. 6. The counter i is incremented to 6.

The method may continue and unite Element 6 with Element 4, as they are of the same type, and uniting the elements would be desirable because total coverage area would be reduced. After uniting Elements 4 and 6, the intersection matrix may look as depicted in FIG. 7.

At this point, the parameter i has reached and exceeded N, and therefore, at block 302 it is determined that the algorithm should proceed with the next stage, as shown in block 318. By now, according to the exemplary embodiment herein described, each element in the document, starting from low-z-axis to high z-axis has been inspected to determine whether it may be united or moved to a lower place in the z-axis order. In the example given, there remain three elements.

Figure 8:
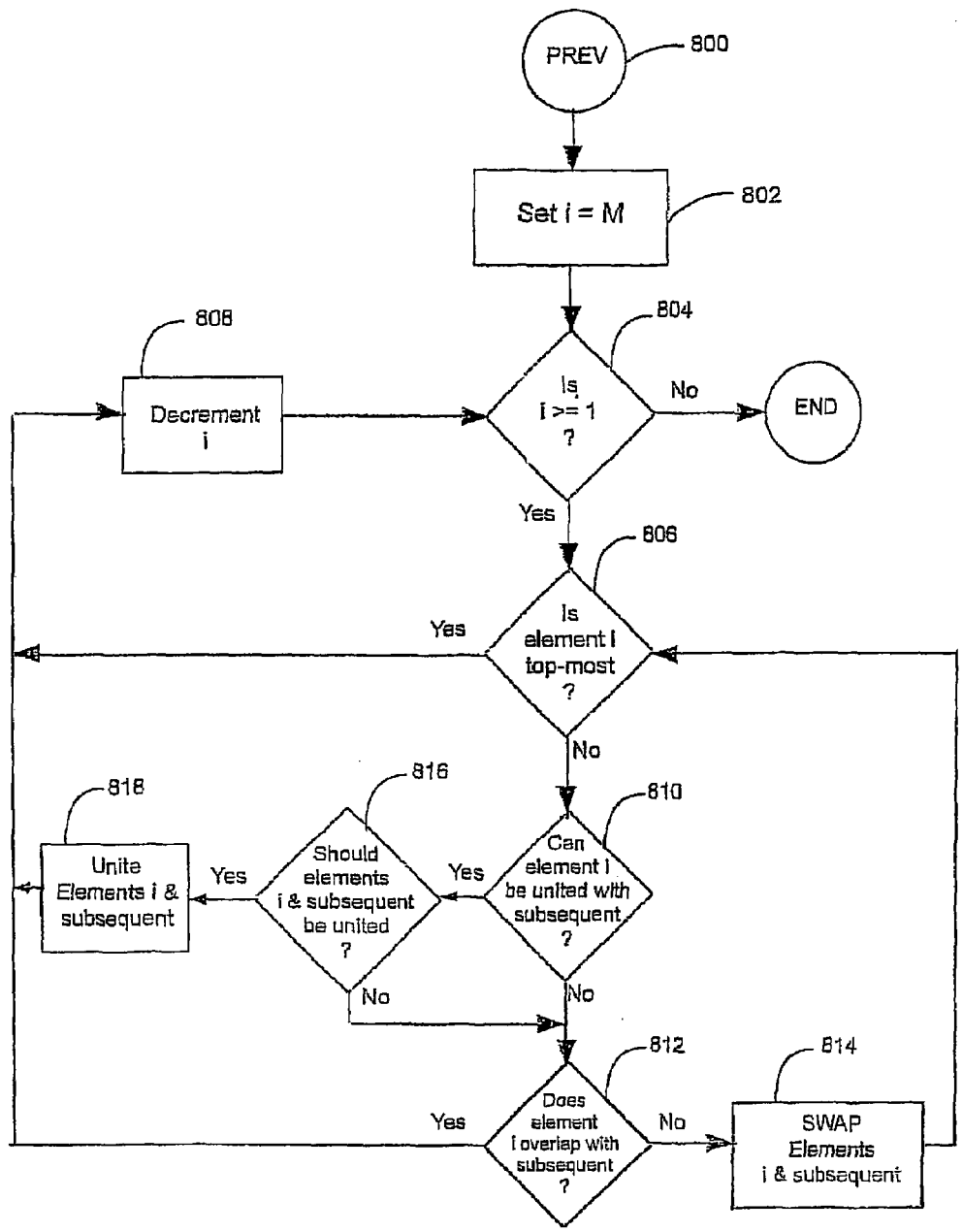
FIG. 8 is a schematic diagram of a flowchart for a method in accordance with embodiments of the present invention.

In an exemplary embodiment of the invention, the modified layout document may inspect each element, starting from high z-axis to low z-axis to determine whether it may be united or moved to a higher place in the z-axis order. FIG. 8 is a schematic illustration of a flowchart for this stage of an algorithm in accordance with an exemplary embodiment of the present invention. Because in the exemplary embodiment of the invention described, the two stages may be similar, this latter stage will be described in less detail. As shown at block 800, this stage may commence after the stage ending in block 318 of FIG. 3. At block 802, the parameter i may be set to M, the highest z-axis of the remaining elements, taking into account the prior combining of elements. In the example provided, M may be 3. As shown at block 806, Element 4U6, the highest element in the z-axis order is determined to be the topmost element in the z-axis order, and at block 808, i is decremented to 2.

As shown at block 810, the next element, Element 1U3U5, cannot be united with the subsequent element, that is, the next-highest element in the z-axis order, namely, Element 4U6, because the elements are of different types. Moreover, as shown at block 812, the elements overlap, and therefore may not be swapped. At block 808, parameter i is further decremented to 1.

The first element in the z-axis order is Element 2. This element may not be united with Element IU3U5. However, as shown in block 812, because the elements do not overlap, they may be swapped, as shown at block 814. The subsequent, or next-highest, element is not 4U6, which, according to block 810, may be united with Element 2 because they are of identical type. After it is determined at block 816 that the two elements should be united to reduce total coverage area, the elements are united at block 818 to form Element 2U4U6.

In the example provided, the two loops of the method according to embodiments of the present invention, the first loop schematically illustrated in FIG. 3 attempting to push elements down in the z-axis order, and the second loop schematically illustrated in FIG. 8 attempting to pull elements up in the z-axis order, are complete. The final result is two elements instead of the original six, a significant reduction in the number of elements. In addition, the new total area is 21 for 1U3U5, and 64 for 2U4U6, which is a total coverage area of 85, a significant reduction in total coverage area from the original total coverage area of 169 units. It will be recognized that the reduction in total coverage area and/or in total number of elements may depend on the method used in accordance with the present invention, and on the input variable print document presented for processing.

According to some embodiments of the present invention, the method may proceed to determine whether elements may be further united to reduce the total number of elements even at the cost of increasing total coverage area. It will be recognized that a similar procedure to the one above described may be used for this purpose, with several modifications. For example, block 314 of FIG. 3 and block 816 of FIG. 8 may be modified to unite elements under consideration only when doing so would not increase the total reduction area to a number greater than a threshold maximum total coverage area. In the example provided, no further reduction in the number of elements is possible, and the method ends.

It will be noted that in the above-described embodiment of the invention, the determination of whether it was desirable to unite particular elements was based on whether doing so would reduce total area coverage. It will be noted that numerous criteria for this determination may be used in accordance with embodiments of the present invention. For example, in the below exemplary embodiment of the invention, the determination may be based on the coverage factor k. As shown below, a pair of elements having low coverage area reduction factor k will be united before a pair of elements having greater k. Moreover, when k is greater than 1, that is, when uniting elements will actually increase the total coverage area, the total area coverage with the pair of elements united is compared against a maximum total coverage area, such that if uniting the elements would cause the document to exceed the maximum total area coverage, the elements are not united.

1. Pre-Processing
    1.1. Order elements by z-order
    1.2. Calculate initial intersection matrix
2. Phase I - Minimize Total Coverage Area
    2.1. Start with k=0.5 and increment by $\Delta k_1$ until k=1
        2.1.1. For each $ELM_i$ in original list:
            2.1.1.1. While $ELM_i$ is not the bottom-most in z-axis order:
                2.1.1.1.1. If CanUnite $ELM_i$ and $ELM_{prev}$ based on parameter k:
                    2.1.1.1.1.1. Unite $ELM_i$, and $ELM_{prev}$
                    2.1.1.1.1.2. Break and Go to 2.1.1.1
                2.1.1.1.2. Else If $ELM_i$, intersects with $ELM_{prev}$
                    2.1.1.1.2.1. Break and Go to 2.1.1.1
                2.1.1.1.3. Else
                    2.1.1.1.3.1. Swap $ELM_i$, and $ELM_{prev}$ in z-axis order
                    2.1.1.1.3.2. Continue and Go to 2.1.1.1.1
            2.1.1.2. While $ELM_i$ is not the topmost in the z-axis order:
                2.1.1.2.1. If CanUnite $ELM_i$ and $ELM_{prev}$ based on parameter k:
                    2.1.1.2.1.1. Unite $ELM_i$, and $ELM_{subsequent}$
                    2.1.1.2.1.2. Break and Go to 2.1.1.1
                2.1.1.2.2. Else If $ELM_i$, intersects with $ELM_{subsequent}$
                    2.1.1.2.2.1. Break and Go to 2.1.1.1
                2.1.1.2.3. Else
                    2.1.1.2.3.1. Swap $ELM_i$, and $ELM_{subsequent}$ in z-axis order
                    2.1.1.2.3.2. Continue and Go to 2.1.1.1.1
3. Phase II - Minimize Number Of Elements
    3.1. Start with k=1 and increment by $\Delta k2$ until k=$k_{max}$
        3.1.1. For each $ELM_i$ in original list:
            3.1.1.1. While $ELM_i$ is not the bottom-most in z-axis order:
                3.1.1.1.1. If CanUnite $ELM_i$ and $ELM_{prev}$ based on parameter k AND If Uniting $ELM_i$, and $ELM_{prev}$ would not cause total coverage to reach $A_{max}$ Then:
                    3.1.1.1.1.1. Unite $ELM_i$, and $ELM_{prev}$
                    3.1.1.1.1.2. Break and Go to 3.1.1.1
                3.1.1.1.2. Else If $ELM_i$, intersects with $ELM_{prev}$
                    3.1.1.1.2.1. Break and Go to 3.1.1.1
                3.1.1.1.3. Else
                    3.1.1.1.3.1. Swap $ELM_i$, and $ELM_{prev}$ in z-axis order
                    3.1.1.1.3.2. Continue and Go to 3.1.1.1.1
            3.1.1.2. While $ELM_i$ is not the topmost in the z-axis order:
                3.1.1.2.1. If CanUnite $ELM_i$ and $ELM_{subsequent}$ based on parameter k AND If Uniting $ELM_i$, and $ELM_{subsequent}$ would not cause total coverage to reach $A_{max}$ Then:
                    3.1.1.2.1.1. Unite $ELM_i$, and $ELM_{subsequent}$
                    3.1.1.2.1.2. Break and Go to 3.1.1.2
                3.1.1.2.2. Else If $ELM_i$, intersects with $ELM_{subsequent}$
                    3.1.1.2.2.1. Break and Go to 3.1.1.1
                3.1.1.2.3. Else
                    3.1.1.2.3.1. Swap $ELM_i$, and $ELM_{subsequent}$ in z-axis order
                    3.1.1.2.3.2. Continue and Go to 3.1.1.1.1

It will be understood that the above algorithm is but an illustration of a model for one embodiment of the invention, and that the invention is not limited in this respect. In the above embodiment of the invention, the method is divided into Phase I and Phase II, where Phase I occurs for k<1 and Phase II occurs for k>1. In Phase II, elements may be unified for increasing values of k until a $k_{max}$ is reached. $k_{max}$ may be selected to be any number greater than 1. According to an exemplary embodiment of the invention, $k_{max}$ may be 5. A larger $k_{max}$ signifies that the algorithm will continue combining elements even where coverage area is increased. Doing so may have the effect of reducing the number of elements, at the cost of increasing total area coverage. The parameters $\Delta k_1$ and $\Delta k_2$ may be fixed or variable, and may be used to control number of iterations of either the Phase I or Phase II loop. As noted above, because Phase II may increase total coverage area of the document, the method may optionally break out of the loop if the total coverage area of the page exceeds a pre-defined limit $A_{max}$, which may be set, for example, by a user, or by hardware or software considerations. This factor may be chosen arbitrarily, or it may be dictated specific hardware or software limitations or implementations. The total area may have, in some systems, an impact on storage size, bandwidth, number of clock cycles, etc. It may be advisable to accommodate a maximal factor based on a specific configuration.

Figure 9:
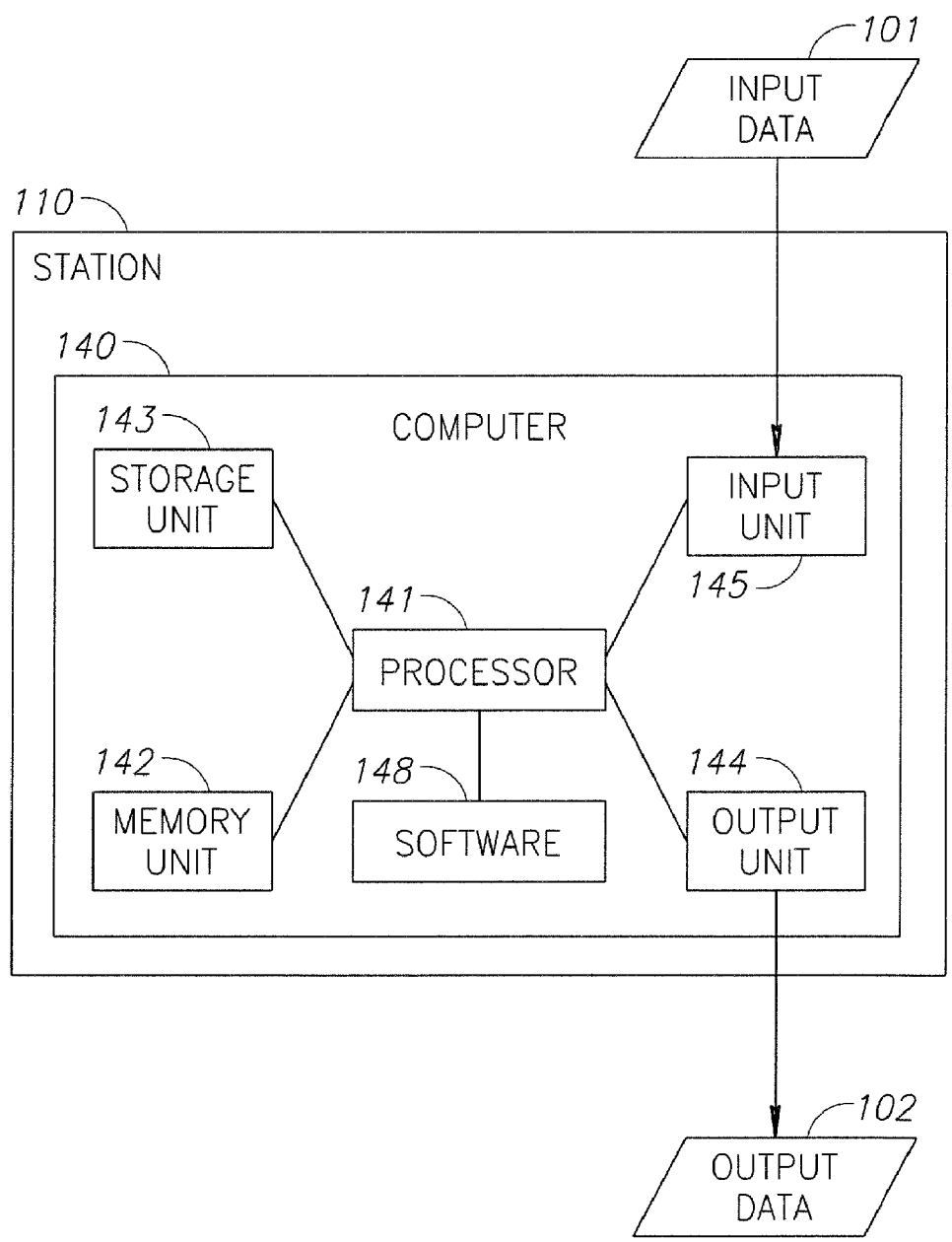
FIG. 9 is a schematic illustration of an apparatus in accordance with some embodiments of the invention.

FIG. 9 schematically illustrates a station 110 in accordance with some embodiments of the invention. Station 110 may be used, for example, to perform analysis in accordance with some embodiments of the invention. Station 110 may be a computing platform or a computing device. For example, station 110 may include a personal computer, a desktop computer, a mobile computer, a laptop computer, a notebook computer, a terminal, a workstation, a server computer, a Personal Digital Assistant (PDA) device, a tablet computer, a network device, a network, or the like. Station 110 may be implemented using any suitable combination of hardware components and/or software components.

In the example shown in FIG. 9, station 110 may include a computer 140, which may include, for example, a processor 141, a memory unit 142, a storage unit 143, an output unit 144, an input unit 145, and a software 148. Station 110 may include other suitable components or sets of components.

Processor 141 may include, for example, a Central Processing Unit (CPU), a Digital Signal Processor (DSP), one or more controllers, or any suitable specific and/or general and/or multi-purpose processor or micro-processor or controller. Memory unit 142 may include, for example, a Random Access Memory (RAM), a Read Only Memory (ROM), a Dynamic RAM (DRAM), or other suitable memory systems. Storage unit 143 may include, for example, a hard disk drive. Output unit 144 may include, for example, a monitor or a printer. Input unit 145 may include, for example, a keyboard, a mouse, a touch-pad, or a scanner. It is noted that processor 141, memory 142, storage unit 143, output unit 144 and/or input unit 145 may include other suitable components and/or implementations as is known in the art.

Software 148 may include, for example, one or more operating systems (e.g., Microsoft Windows, Linux, Unix, Apple OS, Solaris, Sun-OS, HP-UX, or other suitable operating systems), one or more software applications, one or more drivers, and/or various other suitable software components.

In some embodiments, station 110 may receive input data 101 and may produce output data 102. Input data 101 may include, for example, a variable print document in any format currently known or any format known in the future. Input data 101 may be formatted and/or received, for example, in a suitable format. Input data 101 may be entered into station 110 manually, for example, by a designer, and/or automatically, for example, from another program. Input data 101 may include data in other suitable types and/or formats. Any suitable means for receiving the input variable print document may be used in accordance with embodiments of the invention.

It will be understood by those of skill in the art that the method and apparatus of the present invention may be employed by the authoring application before generating the print stream, or, alternately or additionally, it may be employed by the print system to further optimize existing non-optimized print streams. It will be recognized that the embodiment described in the above discussion is not intended to limit the scope of the invention. For example, it will be recognized that the functions performed by the various loops, e.g., starting from low z-order and trying to push elements down or starting from high z-order and trying to pull elements up, from low z-order, may be performed differently by different embodiments of the invention not detailed herein. Likewise, the use of certain parameters, such as k, $\Delta k_1$, $\Delta k_2$, $\Delta k_{max}$, $A_{max}$, and other variables is intended to illustrate an exemplary embodiment of the invention, and is not intended to limit the scope of the invention.

According to some embodiments of the invention, creation of composite elements may take into account an interrelation between elements, for example, transparency, text-wrap, or other parameters.

Transparency may be an attribute associated with graphical elements. Such association may be performed by authoring systems or page layout tools. Transparency associated with an element may define an element, or parts of an element as transparent. A transparent element may expose elements beneath it. For example, a transparent element may expose intersecting elements associated with lower z-axis values. Such exposure may allow elements that would otherwise be hidden to be exposed and seen on a printed page. According to embodiments of the invention, transparency levels may be defined and associated with elements. For example an element may be semi-transparent or twenty percent (20%) transparent. Such levels of transparency may in turn define a level of exposure of intersecting, lower order z-axis elements.

According to embodiments of the invention, objects that affect and/or are effected by transparency may be grouped together into an output, composite element. Such output element may comprise graphic instructions that may yield the rendering of several graphic elements in a manner that takes transparency into account. According to embodiments of the invention, an output composite element may comprise or represent several input elements, such input elements may be transparent or opaque. A composite, output element may represent more than one transparent element. A transparent element may intersect or overlap one or more other transparent elements. According to embodiments of the invention, an output composite element may be constructed such that the correct appearance of multiple, intersecting or overlapping transparent elements and opaque elements is correctly reproduced, for example on a printed page or a computer display.

Figure 10A:
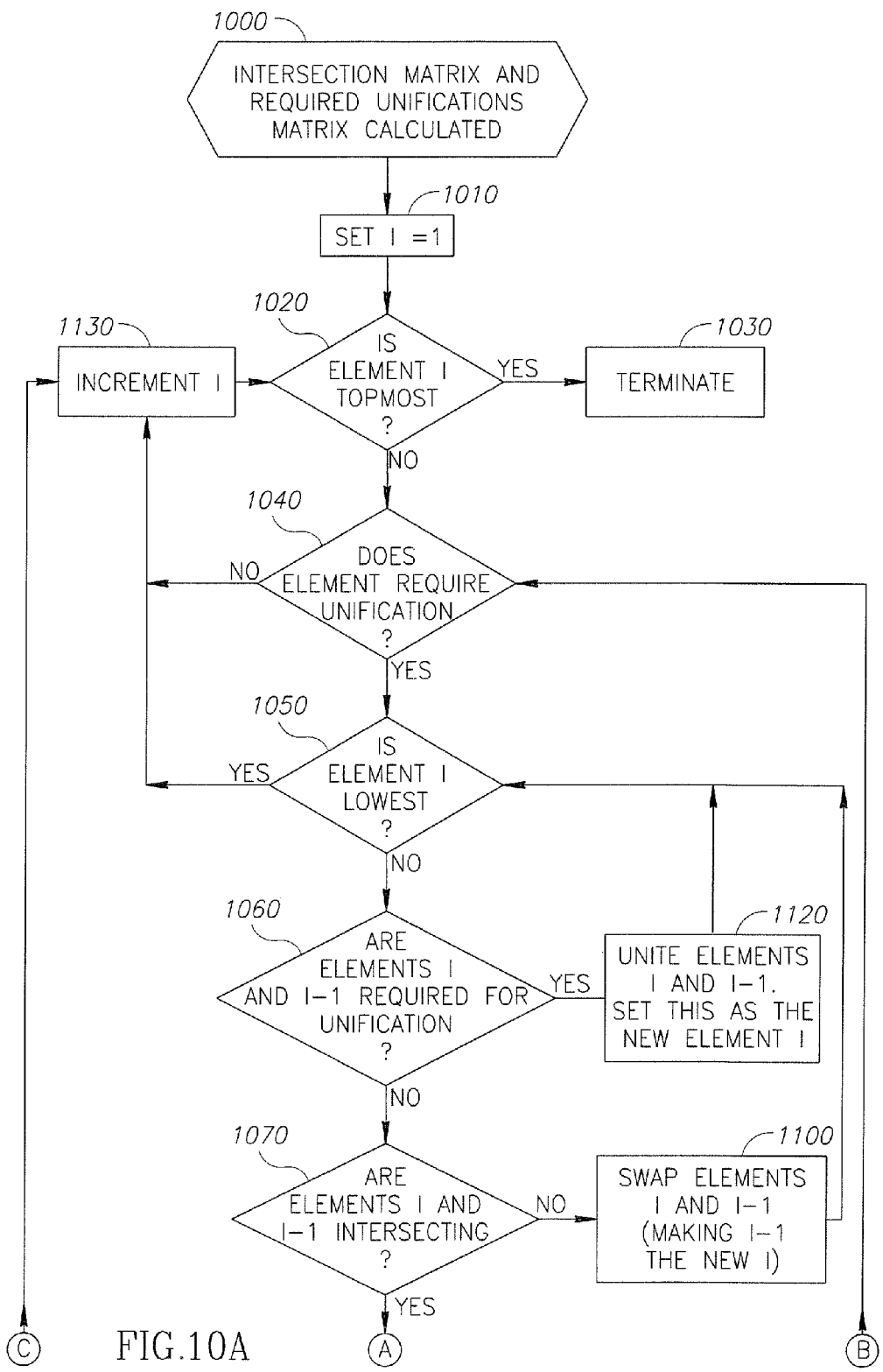
FIG. 10 is a schematic diagram of a flowchart for a method in accordance with embodiments of the present invention.
Figure 10B:
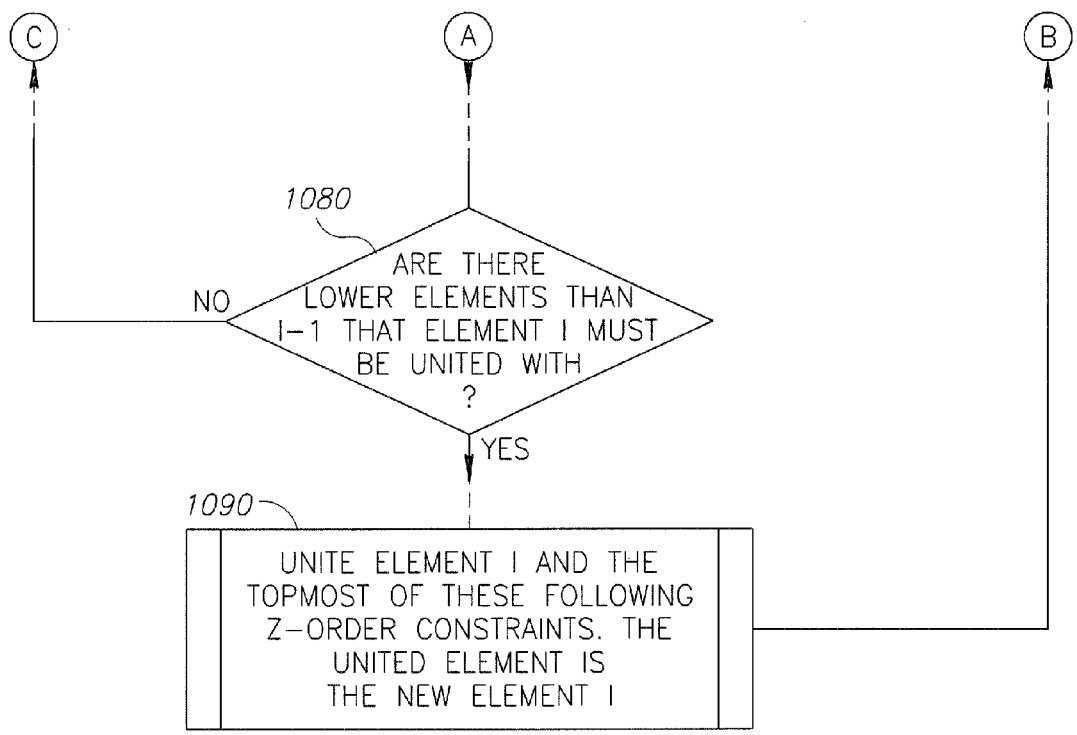

Reference is made to FIG. 10 which is a schematic illustration of a flowchart for processing an image file including one or more variable elements, in accordance with an exemplary embodiment of the present invention. Elements manipulated as depicted by the flow chart shown in FIG. 10 may be produced and/or obtained as described earlier.

According to embodiments of the invention and as indicated by 1000, the flow may be preceded by a construction of a matrix reflecting an intersection and/or overlapping of elements comprising a document. Such matrix may be generated as described earlier. The flow may further be performed with relation to such matrix. According to embodiments of the invention, the flow may iterate through elements in a document. Such iteration may begin with the bottom most element according to a z-axis order as shown by block 1010 where an iteration index i may be set to 1, i.e. setting element 1 as the current element. The element associated with index i will be referred to as the current element hereafter. According to embodiments of the invention and as shown by block 1020, the flow may verify that the current element (the element currently associated with index i) is not the top most element. According to embodiments of the invention, as shown by block 1030, if the current element is the top most element the flow may terminate.

According to embodiments of the invention, as shown by block 1040, the flow may check whether the current element requires unification with other elements. For example, the flow may check an intersection matrix in order to determine whether the current element intersects or overlaps other elements. According to embodiments of the invention, a transparent element may be required to be unified with lower order z-axis, intersecting elements. Such unification may be required in order to prevent a transparent element from being rendered independently of lower order z-axis intersecting elements. Such independent rendering may yield incorrect results as it may not correctly express the effect of transparency. For example, a transparent element covering another element may allow the covered element to be exposed according to its transparency degree. If a transparent, covering element and a covered element were to be rendered independently of one another, or, for example, by only taking their respective z-axis order into account, then the effect of transparency, which may imply exposing parts of the covered element, might be lost.

According to embodiments of the invention, if the current element is not required to be unified with other elements then the iteration index i may be incremented as shown by block 1130. Such increment of the iteration index i may consequently set the current element to be the next element according to an order by which a relevant intersection matrix is ordered. As described earlier, such order may be a z-axis order.

According to embodiments of the invention, the flow may determine if the current element is the bottom most element as shown by block 1050. If the current element is indeed the bottom most then the iteration index i may be incremented as shown by block 1130. According to embodiments of the invention, possibly if the current element is not the bottom most element, flow may determine whether the current element and the element below the current element need to be unified as shown by block 1060. Such determination may include, for example, verifying that the current element is transparent, and further that the current element overlaps, at least to some degree, with the element associated with a z-axis value that is one less than the z-axis value of the current element. For example, if the current element has a z-axis value of 17 then determining whether the current element needs to be unified with the element below it may comprise a) determining that the current element is transparent and that further that the current element overlaps, at least to some degree with the element associated with a z-axis value of 16.

According to embodiments of the invention, if unification is required as indicated by block 1060 then the current element and the element below it may be unified as shown by block 1120. According to embodiments of the invention, the resulting element may be denoted as the current element, for example by assigning the iteration index i to the newly created element, and the flow may continue iterating over the element set.

According to embodiments of the invention, possibly if the current element needs not be unified with the element below it, for example, if the current element does not intersect with the element below it, then the flow, as shown by block 1070, may determine whether the two elements in question intersect. If the two elements (the current element and the one below it) do not intersect then they may be swapped as shown by block 1100. According to embodiments of the invention, swapping of elements may comprise swapping their respective z-axis values. Such swapping of z-axis values may yield the effect of swapping the elements respective positions in respect to a z axis. For example in the example above, swapping may cause the current element associated with a z-axis value of 17 to be placed under the element with a z-axis value of 16.

According to embodiments of the invention and as indicated by block 1080, if the current element and the element below it do not intersect then the flow may check whether there are any other elements that require unification with the current element. For example, if the current element is transparent and the current element intersects with any lower order z-axis element then unification may be required. According to embodiments of the invention, if such unification is not required then the flow may iterate to the next element by, for example, incrementing the iteration index i as shown by block 1130.

According to embodiments of the invention, if unification is required, for example, if the current element is transparent and there exists at least one element below the current element that intersects with the current element then the current element may be unified with one such intersecting element. Such unification is shown by block 1090. According to embodiments of the invention, the current element may be unified with the top most element belonging to the set of lower order z-axis, intersecting elements. For example, suppose the current element has a z-axis value of 23 and that further the current element is transparent. Suppose further that the current element intersects with elements associated with z-axis values of 21, 18 and 11. According to embodiments of the invention, under such scenario, the current element may be unified with the element associated with z-axis value of 21 since that element is the top most element in the set of lower order z-axis, intersecting elements.

According to embodiments of the invention, the resulting element may be denoted as the current element and the flow may proceed iterating over the new set of elements, for example by returning to block 1040 as shown.

An undesirable side effect of a unification as described above may be the reduction in reusability degree. For example, unification of a unique element with a fixed element may produce an element with a unique reusability degree. Another undesirable side effect of unification may be the extended size of the resulting elements. According to embodiments of the invention, a remedy for the above undesirable side effects may be in the form of either a warning to the user or by partial unification. Partial unification may be a method and/or process of unifying parts of elements rather than unifying whole elements. For example, instead of unifying a transparent element with an intersecting lower element, partial unification may only unify the affected section of the covered element with the affecting section of the covering element.

According to embodiments of the invention, the system may alert the user when undesirable unification are about to be performed. For example, if unifying two elements is required, and such unification may substantially decrease reusability and/or increase output size then the system may warn the user of such side effects. The system may further suggest to the user alternative ways for representing the desired graphics while avoiding such undesirable effects.

According to embodiments of the invention, partial unification of elements may be performed by creating agents to represent the relevant, intersecting parts of the elements in question and then unifying the agents. For example, if box A covers box B then the agent of A may be a copy of A inside a box with the shape of B. The agent of B may be a copy of B inside a box with the shape of A.

Figure 11A:
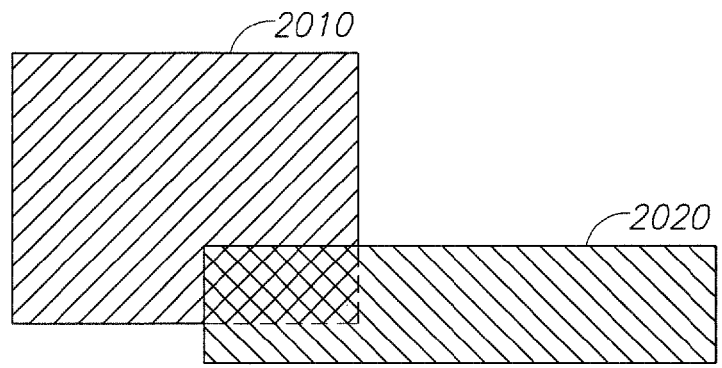
FIGS. 11A, 11B and 11C are conceptual diagrams illustrating exemplary elements and their processing according to embodiments of the present invention.
Figure 11B:
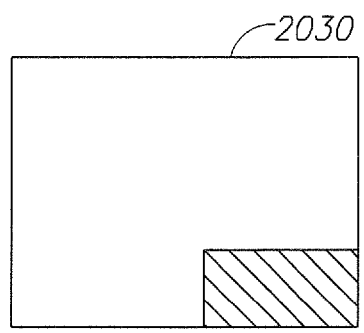
Figure 11C:

Reference is made to FIG. 11A, FIG. 11B and FIG. 11C showing exemplary elements and their respective, possible agents according to embodiments of the invention. According to embodiments of the invention, box 2020 (the covering box) may be a transparent box covering part of box 2010 (the covered box) as shown. According to embodiments of the invention, box 2030 may represent an agent of box 2020. As shown, box 2030 has the shape of box 2010 containing the intersecting section and graphics of box 2020. Accordingly, box 2040 may represent an agent of box 2010. Box 2040 has the shape of box 2020 and further contains the intersecting section and graphics of box 2010.

According to embodiments of the invention, agents represented by boxes 2030 and 2040 may be unified in order to create a new element. Such newly created element may represent correctly the area where the two boxes 2010 and 2020 intersect. According to embodiments of the invention, such newly created element may further be assigned a z-axis value greater than the z-axis value of the covering box 2020. Avoiding a unification of boxes 2020 and 2010 may allow these two boxes to maintain their respective reusability degrees.

According to embodiments of the invention, composite agents may be produced by incorporating the effect of multiple covering boxes into a single agent. For example, suppose box A is partially covered by both box B and box C. In such case, a single agent may represent the combined effect of both boxes B and C on box A. Such agent may possibly have the shape of box A containing the intersecting graphics of boxes B and C.

Figure 12:
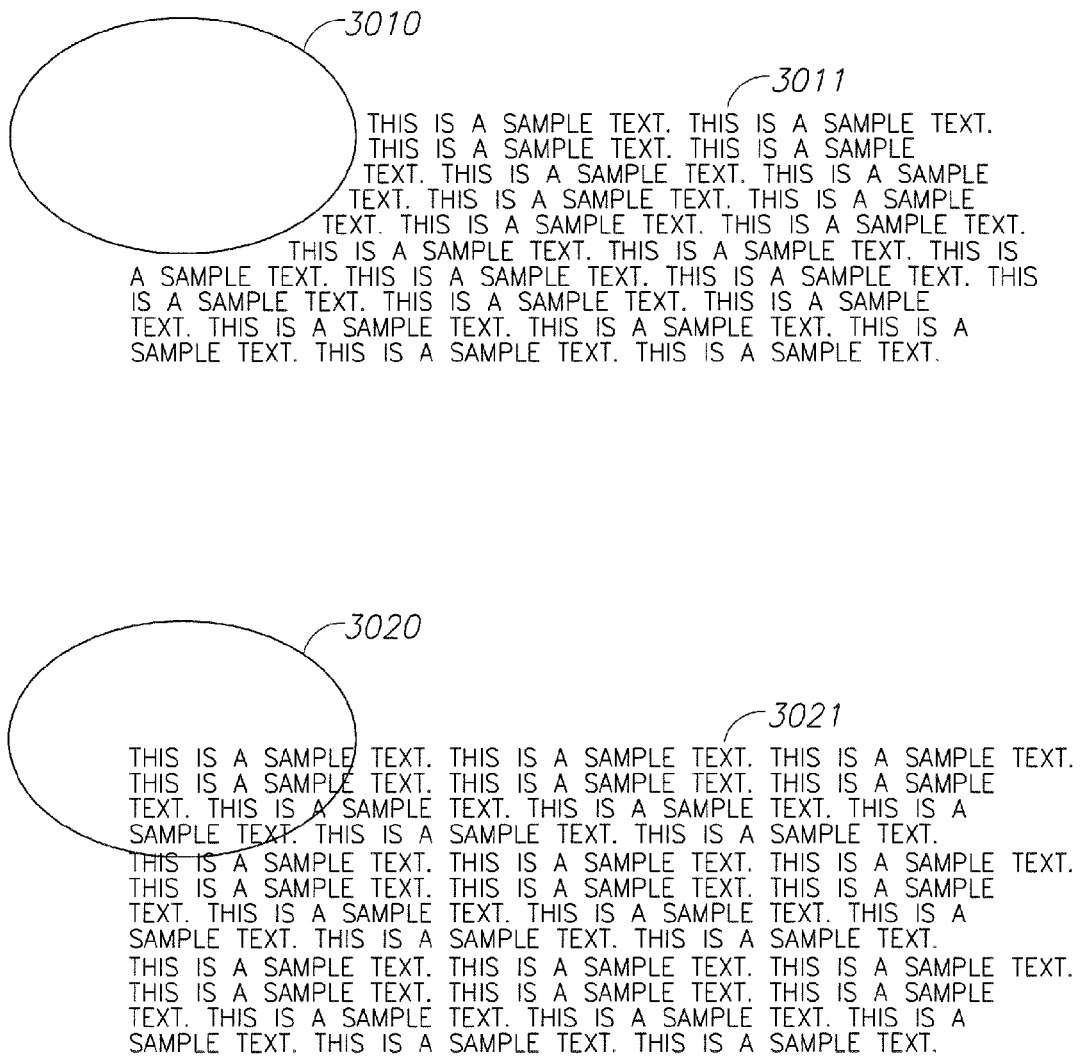
FIG. 12 is a conceptual diagram illustrating exemplary elements and their processing according to embodiments of the present invention.

According to embodiments of the invention, text wrap may be taken into account during various stages of an element unification process. Test wrap is generally an attribute that may be associated with elements. Reference is made to FIG. 12 showing an example of text wrap effect. Element 3020 may have no text wrap attributes associated with it, accordingly, text element 3021 is not affected by the overlapping with element 3020. Element 3010 may have text wrap attributes associated with it, accordingly, text 3011, intersecting with element 3010 is affected as shown. Generally, text wrap may be associated with various aspects of an element. For example, an element may cause text to wrap according to its boundaries, alternatively an element may cause text to wrap according to its content. Since both content of elements and/or boundaries of elements may be dynamic, text wrap effects may also be dynamic. For example, the wrapping of text may vary when the boundaries and/or content of an affecting element vary or change.

According to embodiments of the invention, text wrap handling may comprise following a text through all relevant elements. For example, a text string may flow through and/or by more than one element. A text line may, for example, be contained by one element or box, flow on the boundary of another element and further flow into a third box or element. Consequently, if text wrap is applied by element A, and the affected text intersects not only with element A but also with elements B and C then some modification may be required to be applied to the portion of the text intersecting with elements B and C in order for the text to appear correctly. Following a text string as described may serve in order to record text wrap effects. Such effects may further be recorded and used for decision making in the process of unifying elements.

According to embodiments of the invention, creation of variable output documents may comprise inserting data into variable elements contained in an input document. Such insertion of data may be performed by extracting data from a file, a database or any other suitable repository. For example, an input document may comprise marketing content. In order to personalize the output document, the name of the recipient may be defined as a name template in the input, variable document. Accordingly, producing output documents may comprise filling in a name of a specific recipient into the name template. According to embodiments of the invention, a single input variable document may be used in order to produce many output documents. Typically, output documents sharing the same variable input document will differ according to the data used in conjunction with the variable input document, e.g. recipient name, address and the like.

According to embodiments of the invention, generation of output files may comprise generation of a display list. A display list may comprise elements to be rendered, for example on a printed page or a computer display. According to embodiments of the invention, elements contained in a display list may be composite elements as described earlier. According to embodiments of the invention, a process may iterate through a list of input files and create a display list for each. In other cases, a process may iterate through a list, for example a recipient list, and create a display list for each entry in the list.

According to embodiments of the invention, elements contained in one display list may be used by other display lists. For example, a process may use a single input variable document to produce a number of output documents. Each of the output documents may contain specific and/or unique content while at the same time all output documents may contain some identical content or attributes. In such cases, elements produced for one display list may be reused to produce another display list.

According to embodiments of the invention, a display list generation process may comprise a an entity to manage and/or store information pertaining to rendering elements that may be reused, this entity will be referred to hereafter as snapshots keep. According to embodiments of the invention, a snapshot of a rendering element may contain sufficient information required in order to render the rendering element correctly. According to embodiments of the invention, if a reusable rendering element needs to be used and a snapshot for that rendering element exists, for example stored in snapshots keep, then the snapshot of that rendering element may be used instead of the actual element, for example in a print stream. According to embodiments of the invention, a snapshot of a rendering element may contain all necessary commands required by a rendering device in order to render the rendering element. For example, a snapshot may contain commands in Variable Print Specifications (VPS) format, or Personalized Print Markup Language (PPML). Such commands may be interpreted by a printer and may further cause a printer to print the rendering element.

According to embodiments of the invention, a snapshots keep may store a key for output elements that may be reused. According to embodiments of the invention, a key may be uniquely associated with a snapshot and/or a rendering element. A key generated for a rendering may reflect various aspects associated with its respective element. For example, a key may reflect aspects and/or attribute of an element such as, but not limited to, fonts used, box location and/or orientation, contained rendering elements identifications, and/or images identifications. According to embodiments of the invention, during a process of generating a number of display lists, the snapshots keep may be consulted in order to determine whether a specific element has been produced before. In cases where it is determined that an identical element has been generated previously, and the previously generated element is reusable then the system may reuse the previous element by using a reference to it.

Figure 13:
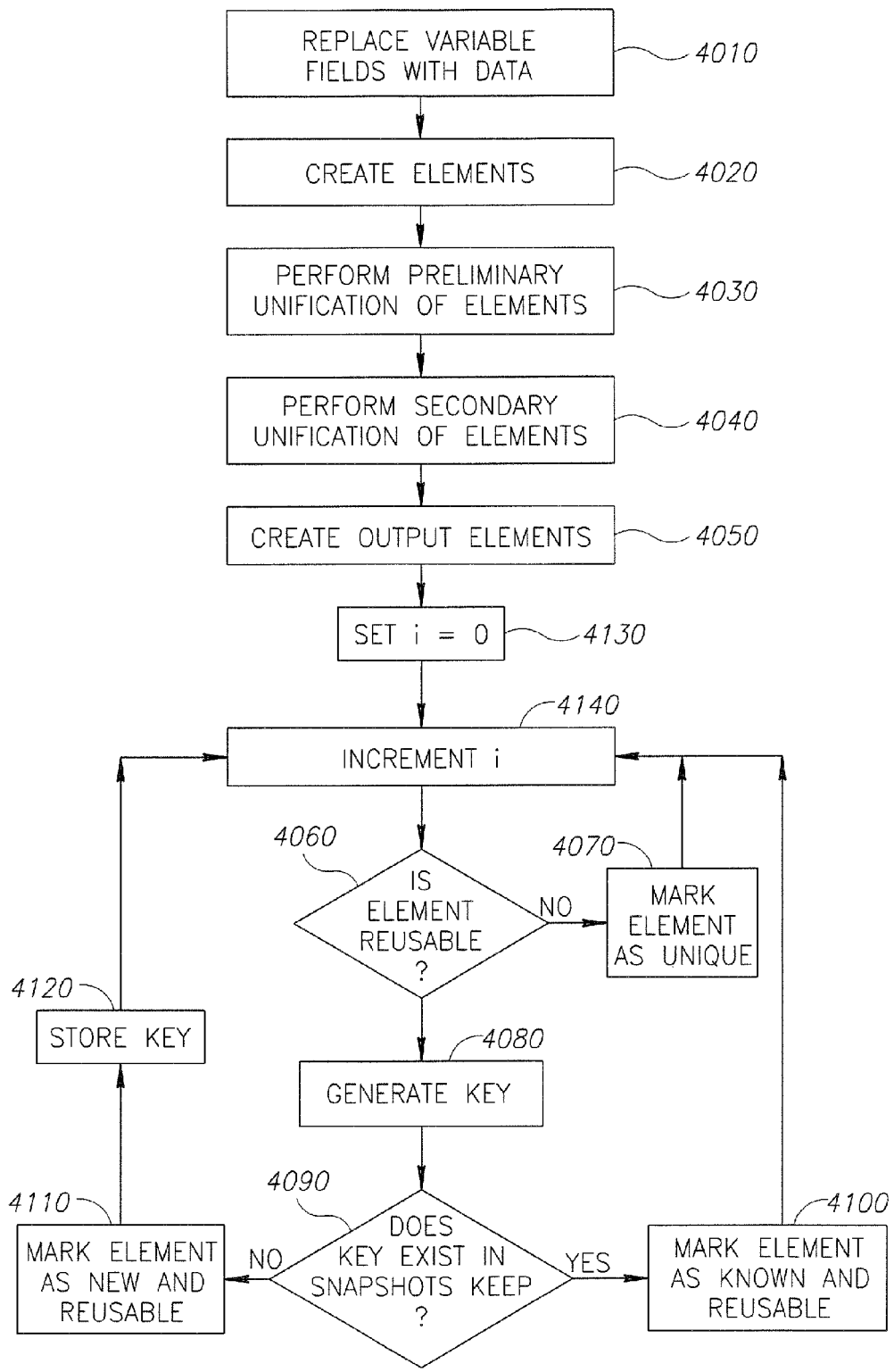
FIG. 13 is a schematic diagram of a flowchart for a method in accordance with embodiments of the present invention.

Reference is made to FIG. 13 showing an exemplary display list production flow according to embodiments of the invention. According to embodiments of the invention and as shown by block 4010, the flow may include replacing variable fields with specific data. For example, an input variable document may contain variable and/or dynamic fields such as recipient name, date or location. Such fields may be replaced by actual or concrete data at this stage.

According to embodiments of the invention and as shown by block 4020, the flow may include creating elements. Typically, elements are created after variable fields have been replaced by actual data. According to embodiments of the invention, elements created at this stage may be simple elements. For example, each element at this stage may contain a single input element. According to embodiments of the invention and as shown by block 4030, the flow may include a preliminary unification of elements. According to embodiments of the invention, a preliminary unification of elements may comprise unifications that may be required in order to preserve inter elements relations and/or aspects. Such aspects and/or relations may be associated with attributes associated with an element that may influence other elements. For example, transparency and/or test wrap.

According to embodiments of the invention and as shown by block 4040, the flow may include a secondary unification phase. A secondary unification phase may comprise unifications of elements aimed at improving the production by, for example, achieving increased performance and/or better utilization of resources. For example, reducing the size of a print stream may reduce time required for printing and/or reduce memory consumption. Computations that may be required to be performed, for example, by a printing device may also be reduced by such unification of elements.

According to embodiments of the invention and as shown by block 4050, the flow may include a creation of output elements. Creating output elements may comprise creating a single composite element for each set of previously unified elements.

According to embodiments of the invention, the flow may iterate through all or some of the elements generated at previous stages. According to embodiments of the invention, an iteration index i may be set to zero (0) as shown by block 4130 and further incremented as shown by block 4140. According to embodiments of the invention, iteration may begin with the bottom most element, such element may be assigned the iteration index of one (1). According to embodiments of the invention, an iteration may include verification that an element is reusable as shown by block 4060. According to embodiments of the invention and as shown by block 4070, if an element is not reusable it may be marked as unique and the flow may proceed to the next element as shown. Determination whether an element is unique may be performed according to criteria described earlier.

According to embodiments of the invention and as shown by block 4080, a key may be generated. According to embodiments of the invention, a key may be generated for reusable elements. Key generation may be performed as described earlier. According to embodiments of the invention and as shown by block 4090, the flow may determine whether a newly generated key already exists, for example by querying the snapshots keep. According to embodiments of the invention, if a key already exists then the element associated with the key may be considered identical to another element. In such case the element may be marked as reusable as shown by block 4100. According to embodiments of the invention, after marking an element as reusable the flow may proceed to the next element as shown.

According to embodiments of the invention and as shown by block 4110, if the key is unique, namely, it is not stored by the snapshots keep, then the element may be marked as reusable and the key may be stored as shown by block 4120. Such a key may be used at a later stage if an identical element is encountered. According to embodiments of the invention, following the storage of a new key the flow may proceed to the next element as shown.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
   means for receiving an input document having a visual appearance corresponding to a plurality of elements, each element being characterized at least by a geometry and a z-axis value, wherein said plurality of elements are further characterized by a coverage area and a type; and
   a processing means for creating an output document by creating at least one composite element in said output document to replace at least two elements having adjoining z-axis values in said input document if creating said composite element is desirable, and otherwise altering z-axis values of said at least two elements if said at least two elements do not overlap, wherein said processing means is further for determining that creating a composite element in said output document is desirable based on compatibility of the types of said at least two elements and based on a comparison of a coverage area of a composite element representing the at least two elements combined to the sum of the coverage areas of the at least two elements;
   wherein said composite element is reused a plurality of times in one or more generations of a print stream.

2. The apparatus of claim 1, wherein if creating a composite element is not desirable, then altering z-axis values of said at least two elements.

3. The apparatus of claim 1, comprising means for:
   generating a key based on content and attributes of said 1 at least two elements; and
   based on said key, reusing said composite element in one or more generations of an output document.

4. The apparatus of claim 3, wherein said determination of whether creating said composite element is desirable comprises determining that creating said composite element is desirable if the element associated with a higher z-axis value is associated with a non-zero text-wrap value.

5. The apparatus of claim 4, wherein if based on said determination creating a composite element representing said at least two elements is desirable, then creating at least one composite element to represent at least two elements comprises creating a composite element representing elements that are associated with a common text string.

6. The apparatus of claim 1, wherein said key is used as reference in a generation of a print stream.

7. The apparatus of claim 6, further comprising storing at least one reusable rendering element, said reusable rendering element associated with said key, wherein said reusable rendering element is used a plurality of times in generation of a print stream.

8. The apparatus of claim 7, wherein said reusable rendering element is referred to in said print stream by its associated key.

9. The apparatus of claim 3, wherein creating composite element comprises creating an output rendering element consisting of an area defined by an intersection of said at least two elements.

10. The apparatus of claim 1, wherein said determination of whether creating said composite element is desirable comprises determining based on a geography of said at least two elements whether said at least two elements intersect.

11. A method of using a processor to create an electronically readable output document based on an electronically readable input document having a visual appearance corresponding to a plurality of elements, each element being characterized at least by a z-axis value and a geometry, wherein said plurality of elements are further characterized by a coverage area and a type, the method comprising:

for at least two elements in the input document having adjoining z-axis values:
(a) determining whether creating a composite element in said output document is desirable, by at least: determining whether types of said at least two elements are compatible, calculating a coverage area of said composite element, and comparing said coverage area of said composite element to the sum of said coverage areas of said at least two elements in said input document;
(b) if creating said composite element is desirable, creating at least one composite element in said output document to represent said at least two elements in said input document and reusing said composite element a plurality of times in one or more generations of an output document;
(c) if creating said composite element is not desirable, and if said at least two elements do not overlap, altering z-axis values of said at least two elements; and producing an output document in which at least one single composite element respectively replaces at least two said elements in the input document.

12. The method of claim 11, wherein if creating said output rendering element is not desirable, then altering z-axis values of said at least two input rendering elements.

13. The method of claim 11, comprising generating a key based on content and attributes of said composite element and reusing said composite element based on said key.

14. The method of claim 13, wherein said determination of whether creating said output rendering element is desirable comprises determining that creating an output rendering element is desirable if the input rendering element associated with a higher z-axis value is associated with a non-zero transparency value.

15. The method of claim 13, wherein said key is used as reference to said output rendering element in a generation of a print stream.

16. The method of claim 13, further comprising storing at least one reusable rendering element, said reusable rendering element associated with said key, wherein said reusable rendering element is used a plurality of times in generation of a print stream.

17. The method of claim 16, wherein said reusable rendering element is referred to in said print stream by its associated key.

18. The method of claim 13, wherein creating an output rendering element comprises creating an output rendering element consisting of an area defined by an intersection of said at least two input rendering elements.

19. The method of claim 11, wherein said determination of whether creating said composite element is desirable comprises determining based on the geography of said elements whether said at least two elements intersect.

* * * * *